United States Patent
Miyachi et al.

(10) Patent No.: US 7,944,572 B2
(45) Date of Patent: May 17, 2011

(54) PROTOCOL ALLOWING A DOCUMENT MANAGEMENT SYSTEM TO COMMUNICATE INTER-ATTRIBUTE CONSTRAINTS TO ITS CLIENTS

(75) Inventors: Christine M. Miyachi, Andover, MA (US); John Y. Zhang, La Canada, CA (US); Gerald A. Wedekind, Rancho Palos Verdes, CA (US); Thomas N. Hastings, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1147 days.

(21) Appl. No.: 11/698,466

(22) Filed: Jan. 26, 2007

(65) Prior Publication Data

US 2008/0180722 A1 Jul. 31, 2008

(51) Int. Cl.
*G06F 3/12* (2006.01)
*G06K 15/00* (2006.01)

(52) U.S. Cl. ...................... 358/1.15; 358/1.13
(58) Field of Classification Search .................. 358/1.1, 358/1.9, 1.13, 1.14, 1.15, 1.18, 468, 474; 714/4; 719/321
See application file for complete search history.

(56) References Cited

U.S. PATENT DOCUMENTS

| | | | |
|---|---|---|---|
| 5,337,258 A | 8/1994 | Dennis | |
| 5,471,563 A | 11/1995 | Dennis et al. | |
| 5,471,564 A | 11/1995 | Dennis et al. | |
| 5,604,843 A * | 2/1997 | Shaw et al. | 358/1.1 |
| 5,778,226 A | 7/1998 | Adams et al. | |
| 5,809,329 A | 9/1998 | Lichtman et al. | |
| 6,336,152 B1 | 1/2002 | Richman et al. | |
| 6,476,821 B2 * | 11/2002 | Sawada et al. | 345/620 |
| 6,760,784 B1 | 7/2004 | Bodin et al. | |
| 7,092,950 B2 | 8/2006 | Wong et al. | |
| 7,222,348 B1 * | 5/2007 | Athreya et al. | 719/321 |
| 7,406,617 B1 * | 7/2008 | Athreya et al. | 714/4 |
| 2002/0129353 A1 | 9/2002 | Williams et al. | |
| 2003/0055806 A1 | 3/2003 | Wong et al. | |
| 2005/0210463 A1 | 9/2005 | Abe | |

OTHER PUBLICATIONS

European Search Report (EP 08150481.3), dated Jul. 9, 2008.

* cited by examiner

*Primary Examiner* — Gabriel I Garcia
(74) *Attorney, Agent, or Firm* — Fay Sharpe LLP (57) ABSTRACT

A system facilitates communication between a control component and a plurality of processing components. One or more processing components performs one or more tasks, each processing component has at least one attribute associated therewith. One or more attribute banks are associated with each of the one or more processing components, wherein each attribute bank stores the at least one attribute. A control component initiates the one or more tasks for each processing component. A universal driver facilitates communication between the one or more processing components and the control component. The driver includes an interrogation component that queries the one or more processing components to receive the at least one attribute associated with each processing component. A constraint evaluator determines combinations of attributes that are supported and unsupported for each of the one or more processing components. An attribute filter categorizes each attribute combination based at least in part on whether it is supported or unsupported.

14 Claims, 6 Drawing Sheets

PROTOCOL ALLOWING A DOCUMENT MANAGEMENT SYSTEM TO COMMUNICATE INTER-ATTRIBUTE CONSTRAINTS TO ITS CLIENTS

BACKGROUND

The following relates to client/server communication protocols. It finds particular application with protocols that allow a document management system to communicate inter-attribute constraints to its clients, and will be described with particular reference thereto. However, it is to be appreciated that the exemplary embodiment is also amenable to other like applications.

Typical networks contain a plurality of devices in communication with each other. In order to facilitate such communication, one or more software components are employed to allow seamless transfer of information and device interoperability. To this end, each device (e.g., a client, a service, etc.) on the network utilized a driver (or similar) to provide particular information to disparate devices. Such drivers were required to be designed for each specific type (model, manufacturer, etc.) of device. Thus, each time new devices were added to a network, a device specific driver was installed to allow communication between the newly added device(s) and the rest of the network.

Figure 1:
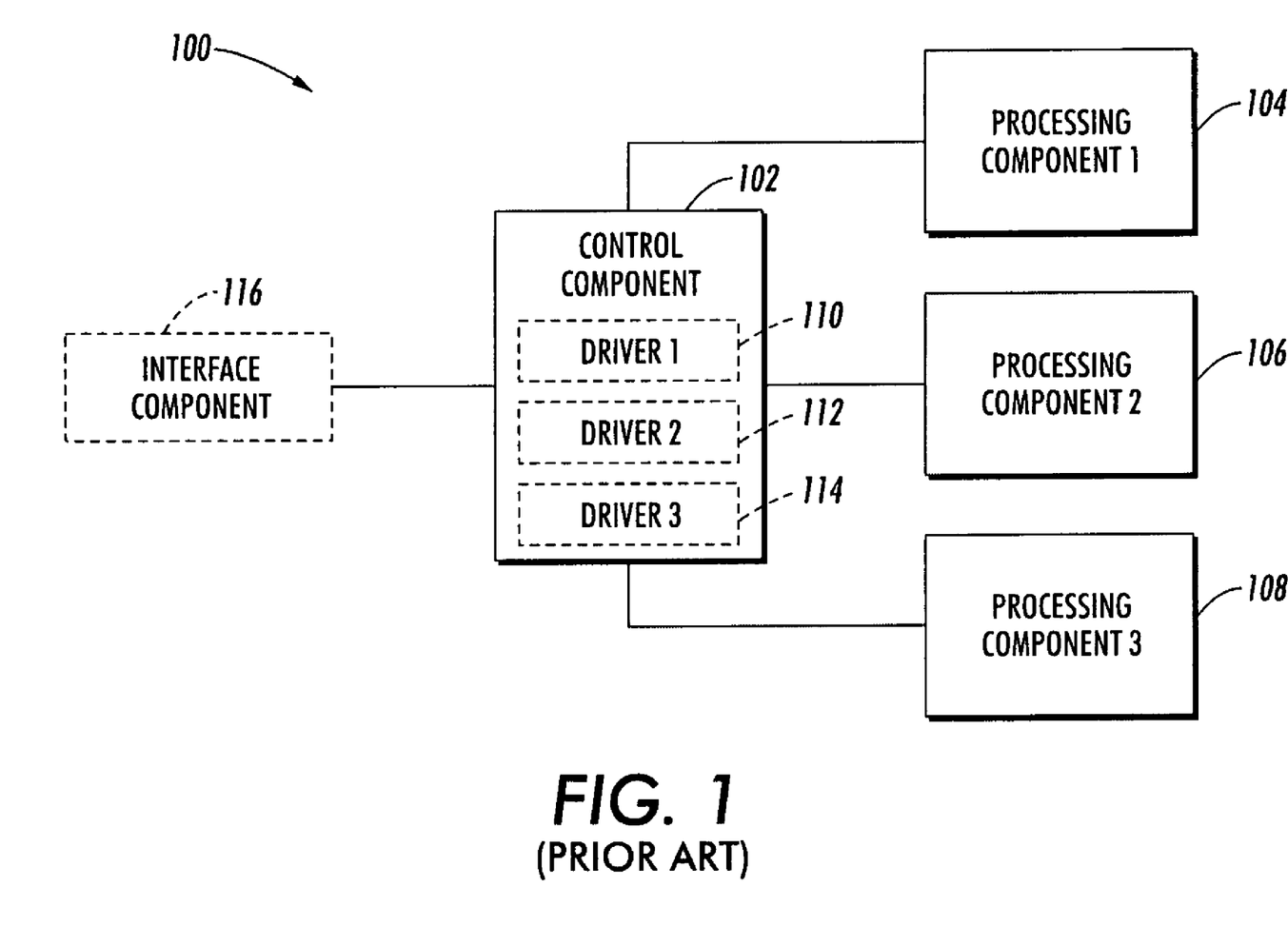
FIG. 1 illustrates a system that facilitates communication between a control component and a plurality of processing components utilizing a plurality of drivers, in accordance with an exemplary embodiment.

FIG. 1 illustrates a conventional network architecture 100 wherein a control component 102 interfaces with processing component 1 104, processing component 2 106, and processing component 3 108. In the network 100, the control component 102 is required to include a driver for each processing component with which it interfaces. As known, a driver is a specific type of computer software, typically developed to allow interaction with hardware devices. This usually constitutes an interface for communicating with the device, through the specific computer bus or communications subsystem that the hardware is connected to, providing commands to and/or receiving data from the device, and on the other end, the requisite interfaces to the operating system and software applications.

A driver is a specialized hardware dependent computer program, which is also operating system specific, that enables another program, typically an operating system or applications software package, to interact transparently with the given device. It usually provides the requisite interrupt handling required for any necessary asynchronous time-dependent hardware interfacing needs. Each driver is specific to the attributes of each processing component.

The key design goal of device drivers is abstraction. Every model of hardware (even within the same class of device) is different. Newer models also are released by manufacturers that provide more reliable or better performance and these newer models are often controlled differently. Computers and their operating systems cannot be expected to know how to control every device, both now and in the future. To solve this problem, operating systems essentially dictate how every type of device should be controlled. The function of the device driver is then to translate these OS mandated function calls into device specific calls. In theory a new device, which is controlled in a new manner, should function correctly if a suitable driver is available. In this manner, the driver will ensure that the device appears to operate as usual from the operating systems' point of view.

Conventionally, inter-attribute constraints are hard coded on a client side such that the driver is tightly coupled with the each device. For example, in this embodiment, each processing component 104-108 has a particular driver to facilitate communication with one or more disparate components on a network. Thus, the control component 102 includes a driver 1 110, a driver 2 112, and a driver 3 114. In this example, the driver 1 110 is employed to communicate with processing component 1 104; the driver 2 112 is employed to communicate with processing component 2 106; and the driver 3 114 is employed to communicate with processing component 3 108. An interface component 116 allows a user to communicate with the control component 102.

Requiring a disparate driver for each component on a network is cumbersome and creates communication problems. This problem is exacerbated by the myriad protocols and communication standards required to communicate with a plurality of different models, manufacturers, etc of devices. In addition, different operating systems require different drivers. For example, a driver has to be developed for each operating system utilized by Mac, Linux, and the various instantiations of Windows. Web services technology was introduced in part to alleviate problems associated with specific print driver communication.

Web services are a distributed computing technology that offers interaction and collaboration among vendors and customers to provide computing that is omnipresent. Typically, web services are loosely coupled software components that are delivered over Internet-standard technologies. Conventionally, a web services model follows a publish, find, and bind paradigm. In a first step, a service provider publishes a Web Service in a Web Service registry. Secondly, a client who is looking for a service to meet their requirement searches in a registry. After successfully finding multiple matches, it chooses a service. The client then chooses a service based on its preferences and subsequently downloads the service description and binds with that to invoke and use the service.

One standard concern of Web-based programmers is how to transmit data in an interoperable manner. At the bottommost layer, an XML standard addresses this. SOAP (Simple Object Access Protocol) is an XML-based mechanism for messaging and RPC (Remote Procedure Calls). It addresses the fundamental problem of firewall traversal in RPC systems by using HTTP as a transport. Thus, SOAP is the protocol used for invoking the service. WSDL (Web Services Description Language) provides an XML-based way of describing a Web Service to provide details of using such service. UDDI (Universal Description Discovery Integration) provides a directory of Web Services, making it easier for clients to discover the services of their choice. The service provider publishes the service description (WSDL) and other searchable details in the UDDI registry. A client uses UDDI to perform the find of a service.

Extensible Markup Language (XML) is an extensible, portable, and structured text format. XML initiative consists of bunch of related standards. Apart from the core XML standard, it includes XSL—Extensible Stylesheet language, which is used to transform XML data into a customizable presentation. XLink and XQuery provide a way to provide flexible query facilities to extract data from real and virtual XML documents on the Web. XPath and XPointer are languages for addressing parts of an XML document.

Utilizing XML involves creating XML documents and consuming XML documents. The creation process involves using editors and tools to create XML documents. On the other hand, consuming XML documents involves parsing the XML documents and extracting the useful data. Creating XML documents is a two step process, which involves 1) defining the grammar and restrictions over data for the XML document and 2) creating the XML document itself.

XML Schemas provides a means of creating a set of rules that can be used to identify document rules governing the validity of the XML documents that you create. Schemas provide a means of defining the structure, content, and semantics of XML documents that can be shared between different types of computers and documents. The XML Schema standard was designed to express object oriented design principles found in common object oriented programming languages into the specification. In addition, XML was designed to provide rich datatyping support similar to the datatyping functionality available in most relational database systems.

What are needed are systems and methods that facilitate comprehensive device communication across a network, wherein client software is device independent.

BRIEF DESCRIPTION

In one aspect, a system facilitates communication between a control component and a plurality of processing components. One or more processing components performs one or more tasks, each processing component has at least one attribute associated therewith. One or more attribute banks are associated with each of the one or more processing components, wherein each attribute bank stores the at least one attribute. A control component initiates the one or more tasks for each processing component. A universal driver facilitates communication between the one or more processing components and the control component. The driver includes an interrogation component that queries the one or more processing components to receive the at least one attribute associated with each processing component. A constraint evaluator determines combinations of attributes that are supported and unsupported for each of the one or more processing components. An attribute filter categorizes each attribute combination based at least in part on whether it is supported or unsupported.

In another aspect, a method is employed to modify the availability of one or more attributes within print network. One or more devices are interrogated to determine attributes associated therewith. A first set of combinations of attributes is determined that cause device failure. The first set of combinations is placed in an unsupported bank for each device. A second set of combinations of attributes is determined that do not cause device failure. The second set of combinations is placed in a supported bank for each device. Access to the first set of combinations is disabled and access to the second set of combinations is enabled.

In yet another aspect, a method is employed to provide appropriate information to a user within a control system. One or more devices in a network are polled to request constraints associated therewith. An audit of each device is performed to determine the constraints. The constraints are received from each device and attributes available to a user based at least in part upon the constraints is determined. A user interface based is modified at least in part upon the available attributes.

DETAILED DESCRIPTION

Figure 2:
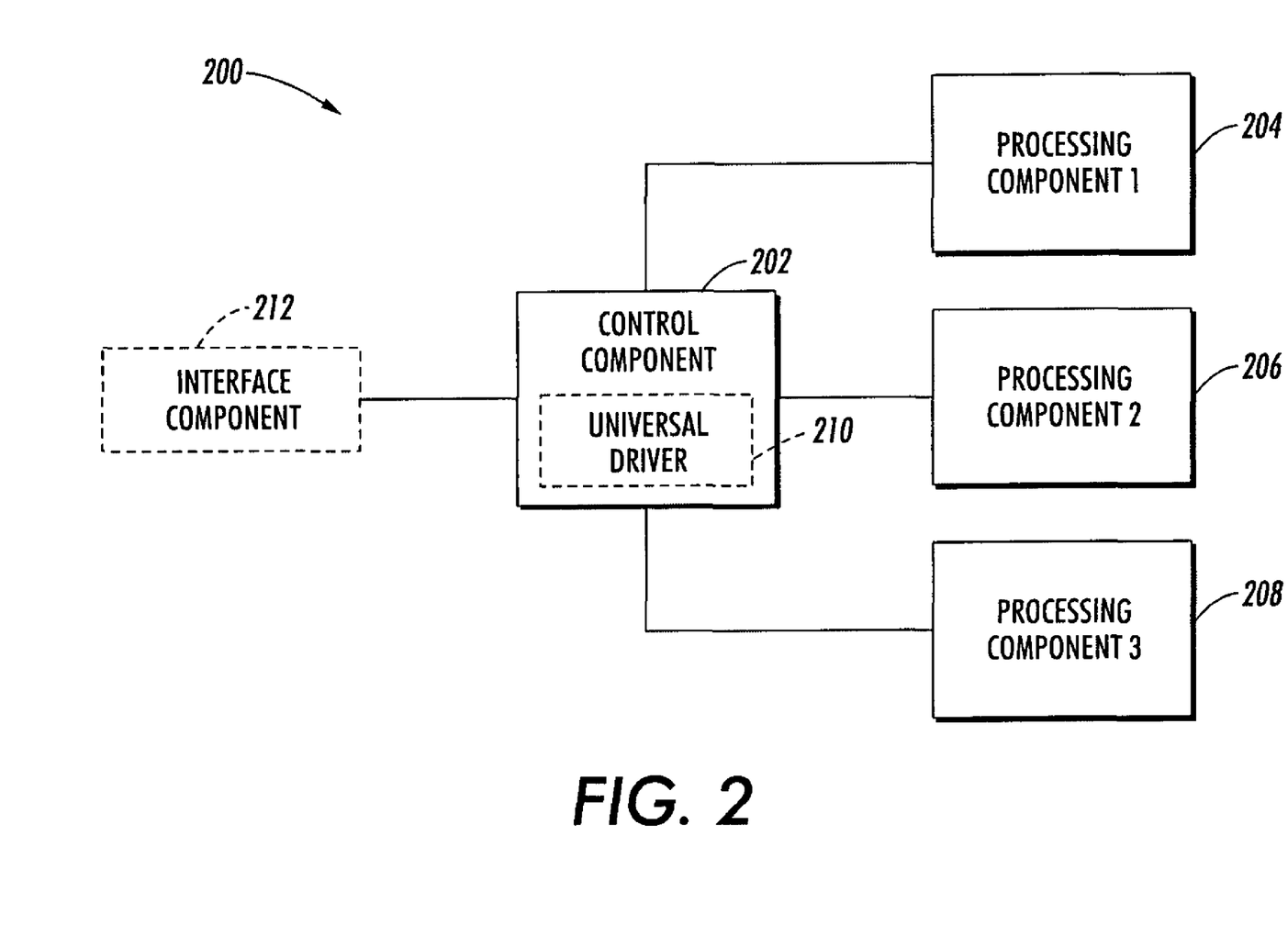
FIG. 2 illustrates a system that facilitates communication between a control component and a plurality of processing components utilizing a universal driver, in accordance with an exemplary embodiment.

FIG. 2 illustrates a system 200 wherein a control component 202 communicates with a plurality of processing components 204, 206, and 208 via a universal driver 210. An interface component 212 is utilized to communicate with the control component 202. The universal driver 210 is employed to communicate with substantially any processing component. In this manner, a single driver can allow seamless interface within a network.

The control component 202 can be substantially any device that facilitates control of one or more disparate components on a network. In one example, the control component 202 is a computer. The computer can include a processing unit (not shown), a system memory (not shown), and a system bus (not shown). The system bus can couple system components including, but not limited to, the system memory to the processing unit. The processing unit can be any of various available processors. Dual microprocessors and other multiprocessor architectures also can be employed as the processing unit.

The system bus can be any of several types of bus structure (s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory can include volatile memory and nonvolatile memory. The basic input/output system (BIOS), containing the basic routines to transfer information between elements within the computer, such as during startup, is stored in nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The control component 202 can also include removable/non-removable, volatile/non-volatile computer storage media (not shown), such as a disk storage. Disk storage can include, but is not limited to, devices like a magnetic disk drive, floppy disk drive, tape drive, Jaz drive, Zip drive, LS-100 drive, flash memory card, or memory stick. In addition, disk storage can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices to the system bus, a removable or non-removable interface is typically used such as the interface component 212.

It is to be appreciated that the control component 202 utilizes software that acts as an intermediary between users and the basic computer resources described in a suitable operating environment. Such software can include an operating system (not shown). The operating system, which can be stored on disk storage, acts to control and allocate resources of the computer system. System applications take advantage of the management of resources by operating system through program modules and program data stored either in the system memory or on the disk storage. It is to be appreciated that the subject embodiment can be implemented with various operating systems or combinations of operating systems.

A user enters commands or information into the control component 202 through one or more input devices (e.g., interface component 212). Input devices can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit through the system bus via one or more interface ports (not shown). Interface ports can include, for example, a serial port, a parallel port, a game port, and a universal serial bus (USB).

In one example, the interface component 212 is a monitor that outputs information to a user. The interface component 212 can display applications that allow a user to view activity related to the processing components 204-208 coupled to the control component 202. In one example, the processing components are print engines. A user can view the status (e.g., capability, capacity, available resources, etc.) of each of the print engines. Utilizing this information, a user can make informed decisions as to how to allocate various tasks, requests, jobs, etc. to the one or more print engines.

One or more output devices (not shown) can utilize some of the same type of ports as the one or more input devices. Thus, for example, a USB port can be used to provide input to the control component 202, and to output information from control component 202 to an output device. An output adapter (not shown) can be employed with some output devices like monitors, speakers, and printers, among other output devices, which require special adapters. The output adapters can include, by way of illustration and not limitation, video and sound cards that provide a means of connection between the output device and the system bus. It should be noted that other devices and/or systems of devices provide both input and output capabilities such as the processing components 204, 206, and 208.

The control component 202 can operate in a networked environment using logical connections to the processing components 204, 206, and 208. The processing components 204-208 can be a personal computer, a server, a router, a network PC, a workstation, a microprocessor based appliance, a peer device or other common network node and the like, and typically includes many or all of the elements described relative to the control component 202.

The processing components 204-208 are logically connected to the control component 202 through a network interface (not shown) and then physically connected via communication connection (not shown). The network interface can encompass communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

The communication connection(s) refers to the hardware/software employed to connect the network interface to the bus. The communication connection can be located either internal or external relative to the control component 202. The hardware/software necessary for connection to the network interface includes, for exemplary purposes only, internal and external technologies such as, modems including regular telephone grade modems, cable modems and DSL modems, ISDN adapters, and Ethernet cards.

The universal driver 210 is employed to communicate with substantially any device coupled to the control component 202 on the network. In one example, the control component 202 has the universal driver installed as a software application. This application provides an interface for communicating with the device(s), through the specific computer bus or communications subsystem that the hardware is connected to, providing commands to and/or receiving data from the device, and on the other end, the requisite interfaces to the operating system and software applications.

A driver is a specialized hardware dependent computer program, which is also operating system specific, that enables another program, typically an operating system or applications software package, to interact transparently with the given device. It usually provides the requisite interrupt handling required for any necessary asynchronous time-dependent hardware interfacing needs. Each driver is specific to the attributes of each processing component.

In contrast to conventional drivers, the universal driver 210 can include several components that allow communication regardless of the type, model, capabilities, communication interface, etc. of the one or more processing components. The basis for such communication is to identify one or more attributes associated with each processing component with which communication is desired. In one example, the processing component 204 is a print engine. This print engine can print in color, print two-sided, includes a feeder, and can print three disparate size of paper stock. In addition, the print engine has a maximum thickness of stock it can process.

The universal driver 210 can interrogate the processing component 204 to determine the attributes associated therewith. One such attributes are received, the universal driver 210 can determine which attributes can be employed at the same or substantially the same time. For example, although the print engine can print two sided copies and print a maximum stock thickness, it may not be able to print two-sided copies with the maximum thickness of stock. Such maximum thickness may be limited to single sided copies. It is to be appreciated that although this example is given, there are any number of such attribute combinations that cannot be performed together. As described herein, such combinations are referred to as constraints.

One the constraints for the processing component 204 are established, the universal driver can limit access to one or more attribute combinations. In this manner, deleterious effects can be mitigated with respect to the processing component 204. For instance, by utilizing one or more constraints, the processing component 204 can stall, go offline, damage one or more structures, etc. Thus, by limiting access to the attributes associated with the processing component 204, a user can safely interface with the processing component 204.

Figure 3:
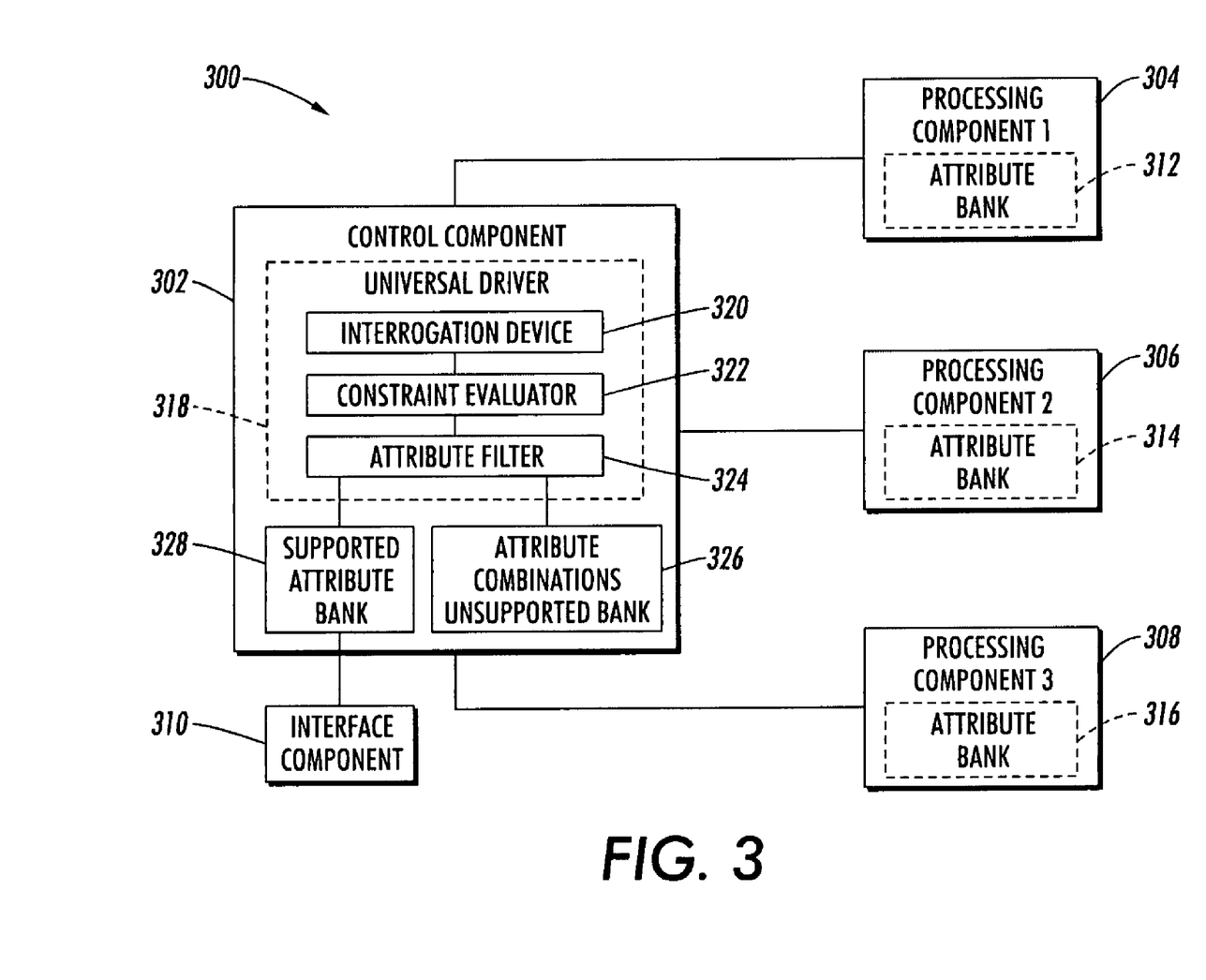
FIG. 3 illustrates a system that facilitates communication between a control component and a plurality of processing components utilizing a universal driver, in accordance with an exemplary embodiment.

FIG. 3 illustrates a system that facilitates communication between a control component and a plurality of processing components utilizing a universal driver. The system includes a control component 302 that communicates with a processing component 304, a processing component 306, and a processing component 308. An interface component 310 is employed to communicate with the control component 302. In this exemplary embodiment, the processing component's attributes are defined and stored locally to enable the control component 302 (and associated software) to be independent of the processing components 304-308 that interface with the control component 302. Each of the processing components includes an attribute bank: processing component 304 includes an attribute bank 312; processing component 306 includes an attribute bank 314; and processing component 308 includes an attribute bank 316.

A universal driver 318 is employed to facilitate communication between the control component 202 with the processing components 304-308. The universal driver 318 includes an interrogation device 320, a constraint evaluator 322, and an attribute filter 324. The attribute filter 324 interfaces with an attribute combinations unsupported bank 326 and a supported attribute bank 328. As noted, the universal driver permits communication between the control component 302 and one or more processing components (e.g., processing components 312-316). In one example, the processing component is a print engine and the control component is a computer. The universal driver 318 can be employed to communicate with all devices from a particular manufacturer, specific device types, specific models, etc. Thus, there can be various levels of communication interface capability provided by the universal driver 318.

The processing components 304-308 each have one or more attributes associated therewith. Such attributes are inherent in the design of each processing component. In one example, the attributes of each processing component are stored in the attribute banks 312-316. The attributes can be related to substantially any feature, aspect, function that can be performed by each processing component. In one example, attributes include scanning, printing, one-sided copying, two-sided copying, stapling, folding, image modification, and paper feeding. Each of these attributes can have one or more limitations on the functionality associated therewith. In one example, the processing components 304-308 are document management devices.

In another example, requests submitted to the document management devices (e.g., by the control component 302) including printing systems are often called jobs. These jobs are described by attributes that will determine what the final output will be. For instance, a print job might have a stapling attribute and a scan job might have a filing location attribute. Sometimes these attributes conflict, meaning that the particular device cannot satisfy these two attributes together. An example is trying to staple heavy paper stock when the device is not able to staple that heavy of a stock. The client software will offer up a user interface that will not allow a user to select stapling when that particular stock is chosen as the media type. Thus, these two attributes are constrained.

As described herein, a method is employed to describe such constraints which are device dependent and send them to the client via network protocols in a format that is consumable by the client. In one example, this format is part of Common Print Semantic Specification (CPSS). It is to be appreciated that substantially any protocol and/or standard can be employed to communicate information throughout the network 300. In another example, web services are employed to provide communication between the control component 302 and the processing components 304-308. In this example, XML schema can be employed to contain and transmit specific data for consumption by one or more recipients. This data can be parsed from the XML code by one or more components.

As noted, the universal driver 318 includes several components employed facilitate communication between the control component 302 and the processing components 304-308. The interrogation device 320 sends a query to the processing components 304-308 to request information from each of the attribute banks 312-316. This query can be sent based on an event, periodically or one time (e.g., upon system start up). The attribute information is received and correlated to each of the processing components.

The interrogation device 320 can receive information that is related to substantially any aspect of the processing components 304-308. For example, the interrogation device 320 can receive one or more capabilities, a status, a default job ticket, etc. This information can be utilized by the universal driver 318 to specify constraints. In turn, the universal driver can communicate one or more job tickets and/or a PDL stream to the processing components 304-308.

The constraint evaluator 322 determines the combinations of attributes that are supported and unsupported. As discussed above, although a processing component may have a plurality of attributes associated therewith, utilizing all of the attributes at substantially the same time may not be feasible. The constraint evaluator can contain a memory (not shown) wherein a bank of predetermined attribute combinations can be stored. Such combinations can be specific to particular processing components. In one example, a model from a particular manufacturer can have 173 disparate combinations of attributes which are unsupported, and 432 attribute combinations which are supported.

Alternatively or in addition, the interrogation device 320 can provide specific information related to each of the processing components 304-308. This information can be communicated to the constraint evaluator 322 which can utilize an artificial intelligence component to determine the constraints associated with each processing component 304-308. The constraints associated with each processing component can be generated by machine learning wherein one or more training sets of data with examples of desired results and/or undesired results for searches can be utilized to train the system. In another aspect of the subject embodiment, initial conditions, based on one or more features that indicate desired results, can be utilized. Such initial conditions can be adjusted over time and in response to user actions associated with returned results in order to improve discrimination. For example, results utilized by the user can be employed to train the system to learn desired results for the associated query. In addition, knowledge of which constraints are most often determined for a particular processing component can be used to configure the interface component to expose only such information that user can utilize.

In addition, as utilized herein, the term "inference" refers generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources. Various classification schemes and/or systems (e.g., support vector machines, neural networks (e.g., back-propagation, feed forward back propagation, radial bases and fuzzy logic), expert systems, Bayesian networks, and data fusion) can be employed in connection with performing automatic and/or inferred action in connection with the subject embodiment.

In yet another aspect of an exemplary embodiment, a technique can be employed to anticipate the appropriate constraint set for each processing component. For example, information such as make, model, manufacturer, attributes, etc. of the processing component and attributes associated with such data can be employed to predict a constraint set. For example, intelligent decisions based on statistics, probabilities, inferences and classifiers (e.g., explicitly and implicitly trained), including Bayesian learning, Bayesian classifiers and other statistical classifiers, such as decision tree learning methods, support vector machines, linear and non-linear regression and/or neural networks can be employed in accordance with an aspect of the subject embodiment. In this manner, the AI component (not shown) can be employed by the constraint evaluator to provide decision making based on learned actions of a particular data consumer (e.g., the control component 302) in relation to a particular data source (e.g., the processing components 304-308).

In one example, the processing component 308 is a printer which has particular constraints on two-sided printing and transparent or envelope media. In this example, the printer supports the 'stationery,' 'transparency,' and 'envelope' values of the "media type" member attribute of the "medi-col" collection attribute. In addition, the printer supports three values of the "sides" Job/Document Template attribute that two-sided printers support. In addition, the printer does not support printing two sided on envelopes and transparencies. In order to communicate these constraints, the printer would return the following attributes from the attribute bank 316 to the universal driver 318:

```
sides supported = 'one-sided' 'two-sided-long-edge' 'two-sided-short-edge'
media-type-supported = 'stationery' 'transparency' 'envelope'
combinations-unsupported = 'two-sided-long-edge' 'two-sided-short-edge'
{   sides supported = 'two-sided-long-edge' 'two-sided-short-edge'
    media-type-supported = 'transparency' 'envelope'
}
``` or equivalently:

```
combinations-unsupported
{   sides supported = 'two-sided-long-edge' 'two-sided-short-edge'
    media-type-supported = 'transparency'
}
{   sides supported = 'two-sided-long-edge' 'two-sided-short-edge'
    media-type-supported = 'envelope'
}
```

In another aspect of the exemplary embodiment, the constraint evaluator can communicate constraint information to the processing components 304-308. In this manner, each processing component 304-308 can change its own defaults dynamically when the default value is constrained with attributes of the submitted job. Dynamic defaults can also be communicated to the processing components 304-308 by the control component 302. An example of dynamic defaults is shown below. If the static default is 'two-sided-long-edge,' media type is transparency or envelope, and if static default is two sided, then dynamic default should be one-sided. The printer would return the static and dynamic defaults as:

```
media-type-default = 'stationery'
sides-default = 'two-sided-long-edge'
combinations-default
{   media-type-supported = envelope, transparency
    sides-default = one-sided
}
```

The attribute filter 324 can receive the constraint information related to each of the processing components 304-308 and communicate information to the attribute combinations unsupported bank 326 and supported bank 328 based one or more conditions. For example, one condition can be a software application associated therewith, an operating environment employed by the control component 302, etc. Although, the attribute filter is illustrated as parsing data for delivery to two recipients, it is to be appreciated that substantially any number of conditions and recipients can be utilized.

The attribute combinations unsupported bank 326 contains all of combinations of attributes for each of the processing components 304-308 that are unsupported (e.g., constraints). In other words, if a user attempts to employ one or more of these combinations, deleterious results can occur. The attribute combinations unsupported bank 326 (and similarly the supported attribute bank 328) can be substantially any type of memory. For example, the attribute combinations unsupported bank 326 can be nonvolatile memory can include read only memory (ROM), programmable ROM (PROM), electrically programmable ROM (EPROM), electrically erasable ROM (EEPROM), or flash memory. Volatile memory includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The supported attribute bank 328 includes one or more attribute combinations that are supported by the processing components 304-308. These combinations are not constraints and can be utilized without causing any deleterious effects. The interface component 310 receives information from the supported attribute bank 328 and communicates such information to a user. In another aspect, data from both the supported attribute bank 328 and the attribute combinations unsupported bank 326 can be communicated to the interface component 310. In one example, the unsupported attributes are visible but not accessible to a user. In another example, all attributes are visible and accessible. However, if a user selects one or more unsupported combinations, the control component will ignore the request and instead perform a predefined action. In one instance, the predefined action is a substitute action. In another instance, no action is taken.

Figure 4:
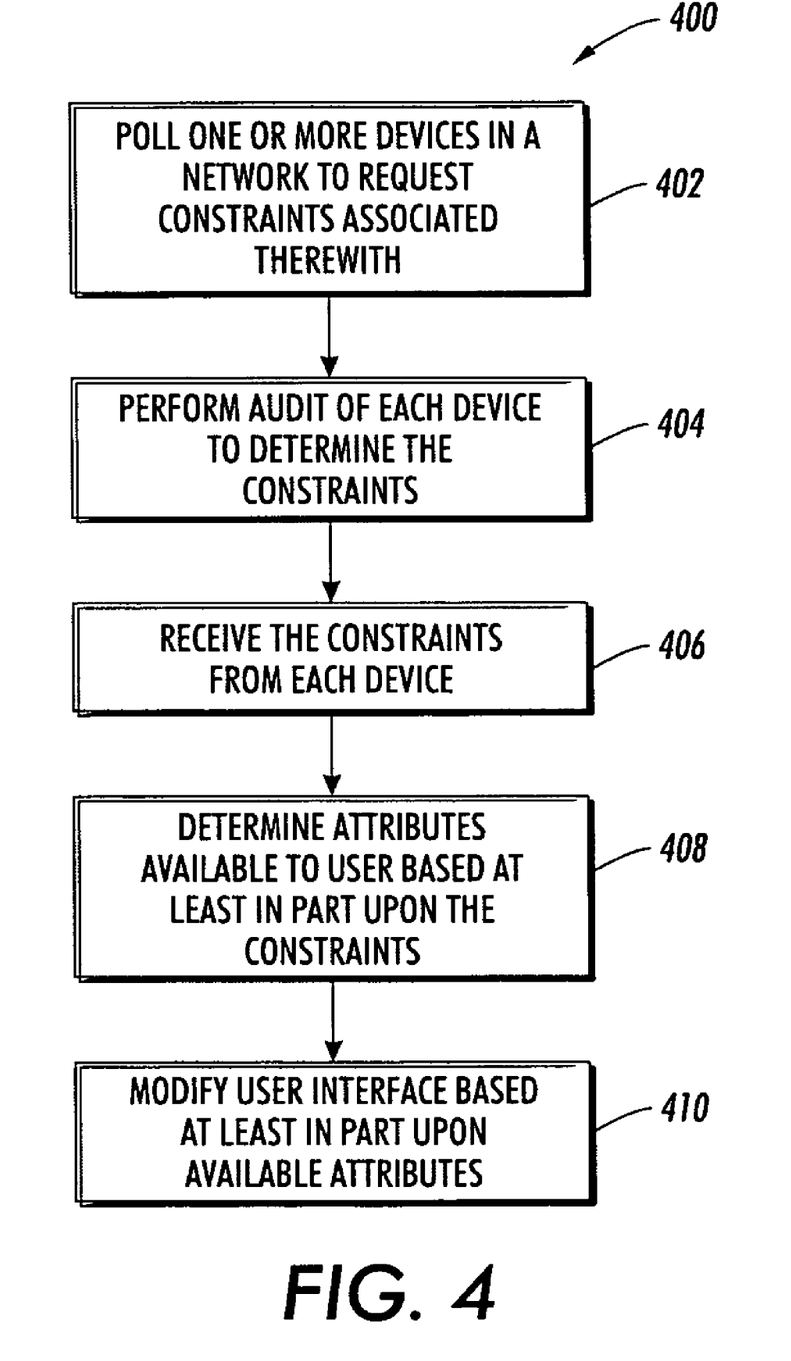
FIG. 4 illustrates a methodology to modify a user interface based at least in part upon available attributes associated with one or more devices on a network, in accordance with an exemplary embodiment.
Figure 5:
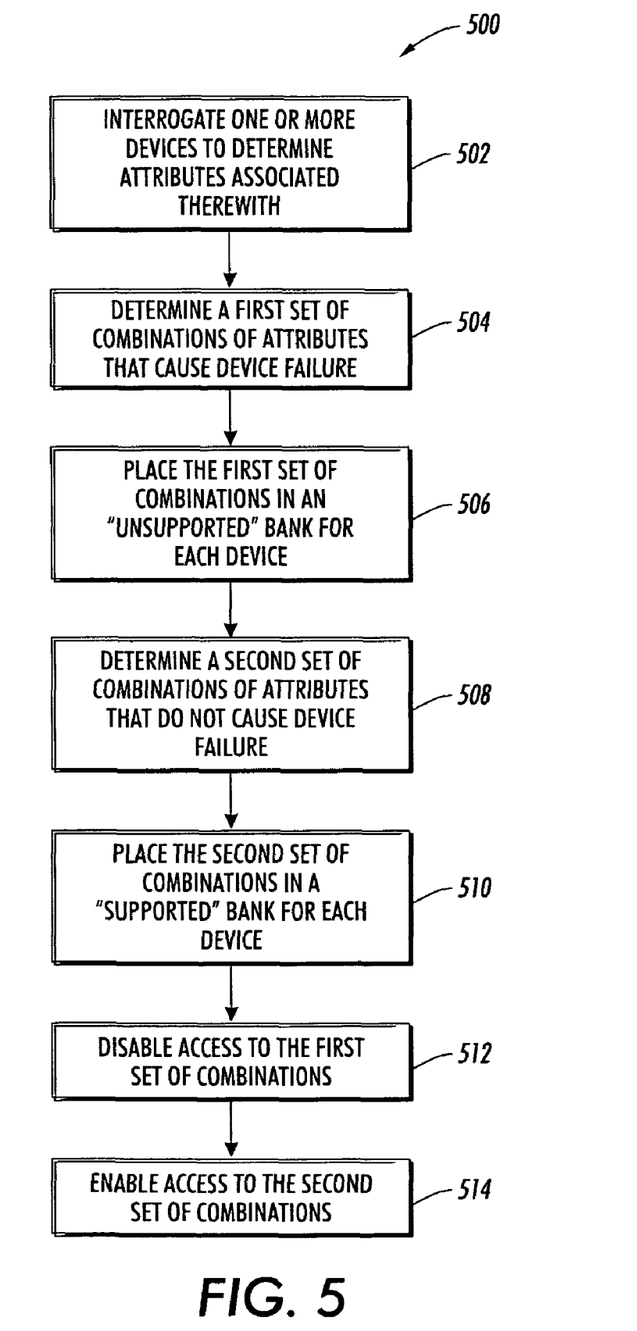
FIG. 5 illustrates a methodology to filter user access to one or more device attributes based at least in part upon constraints associated therewith, in accordance with an exemplary embodiment.
Figure 6:
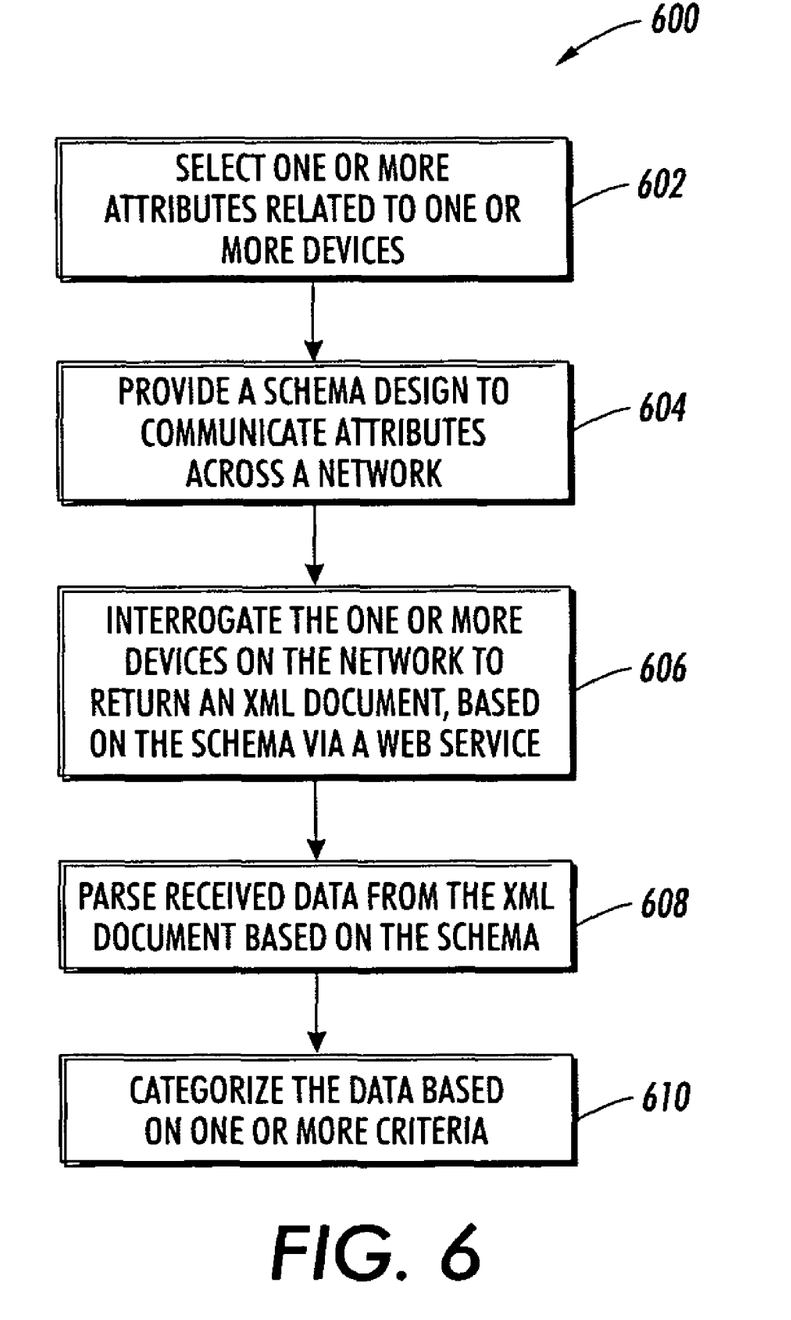
FIG. 6 illustrates a methodology to categorize device attribute data based on one or more criteria, in accordance with an exemplary embodiment.

FIGS. 4, 5 and 6 illustrate methodologies 400, 500, and 600 in accordance with subject embodiments. For simplicity of explanation, the methodologies are depicted and described as a series of acts. It is to be understood and appreciated that the subject embodiments are not limited by the acts illustrated and/or by the order of acts, for example acts can occur in various orders and/or concurrently, and with other acts not presented and described herein. Furthermore, not all illustrated acts may be required to implement the methodologies in accordance with the subject embodiments. In addition, those skilled in the art will understand and appreciate that the methodologies could alternatively be represented as a series of interrelated states via a state diagram or events.

FIG. 4 illustrates a methodology 400 to modify a user interface based at least upon one or more attributes. At 402, one or more devices in a network are polled to request one or more constraints associated therewith. In one example, the polling can be initiated by a client (e.g., a control component). At 404, each device that received a polling request performs an audit to determine constraints particular to each device. In one aspect, a set of attribute combinations is predetermined and programmed (e.g., via firmware) into each device. Attribute combinations which are unsupported can be designated as constraints and are particular to each device. At 406, the constraints from each device are received.

At 408, the attributes available to a user are determined based at least in part upon the constraints. In one aspect, combinations of attributes that are supported are determined to be available. In contrast, attributes that are unsupported are determined to be unavailable. As discussed, supported or unsupported attributes can be determined based on combinations of attributes that when performed, accessed and/or initiated can cause deleterious effects relative to a device. Thus, at 410, a user interface can be modified based at least in part upon one or more available attributes. In one aspect, modifying a user interface can include displaying only those attributes which are available to a user. In another aspect, a user interface can be modified such that all attributes are displayed, but only supported attribute combinations are accessible.

FIG. 5 illustrates a methodology that enables or disables access to attribute combinations based upon a device failure condition. At 502, one or more devices are interrogated to determine attributes associated therewith. In one aspect, such interrogation can occur over a network utilizing web services via XML schema. The interrogation can be initiated by a control component, such as a computer for example.

At 504, a first set of attribute combinations is determined to cause device failure. In one example, failure can be any action that limits the available activities/features of the device (e.g., stalling, jamming, component damage, etc.). Such combination can be predefined based on prior knowledge of a device and one or more attributes associated therewith. In another aspect, combinations of attributes that cause device failure can be determined by an artificial intelligence component. At 506, the first set of combinations is placed in an "unsupported" bank for each device. This bank can store the combinations in substantially any manner. For example, the attribute combinations can be stored based on device type (e.g., printer, scanner, facsimile machine, etc.), model (X2, CFG4, MDL7000, etc.), manufacturer, etc. In this manner, such combinations can be easily retrieved for subsequent use.

At 508, a second set of attributes is determined that do not cause device failure. As noted, such combinations can be predefined or determined as attributes are received for each device. At 510, the second set of combinations is placed in a "supported" bank for each device. At 512, access to the first set of combinations is disabled and, at 514, access to the second set of combinations is enabled. In this manner, attributes associated with each device can be categorized and accessibility to such attribute combinations can be limited to prevent failure of any of the one or more devices.

FIG. 6 illustrates a methodology to categorize data received via web services based on one or more criteria. At 602, one or more attributes are selected which are related to one or more devices. In one example, an attribute can be related to one or more categories sides-supported, media-type-supported, etc. Each category can have one or more member attributes within each category. For example, sides-supported can include one-sided, two-sided-long-edge, two-sided-short-edge, etc. Alternatively or in addition, media-type-supported can include stationery, transparency, and envelope.

At 604, a schema design is provided to communicate the attributes across a network. Such schema can be supported by one or more protocols such as web services and be written in an extensible markup language (XML). These distributed services can process the XML-encoded simple object access protocol (SOAP) messages sent over HyperText Transfer Protocol (HTTP) and described using Web Services Description Language (WSDL). In addition, communication can be facilitated via an IPP protocol, USB protocol, etc.

Utilizing web services can provide interoperability between software components that can communicate between different companies and can reside on different infrastructures. WSDL can provide the description of a service to support interoperability between development tools. In addition, WSDL can complement communication interoperability with the ability to exchange interface definitions. Since they are a service oriented architecture, web services interact based on contracts (e.g., WSDL/BPEL4WS for message processing behavior) and schemas (WSDL/XSD for message structure). This enables the service to describe the structure of the messages it can send and/or receive and sequencing constraints on these messages.

At 606, the one or more devices on the network are interrogated to return an XML document based on the schema, via a web service. In one aspect, a service queries the network devices to gather attributes associated with each device. Alternatively or in addition, a service can provide updated information to the client based on product modifications and/or the introduction of one or more devices to the network. At 608, data received via the XML document, based on the schema is parsed. Such data can include one or more attributes related to each device. Additional data can include default settings, constraints, possible attribute combinations, etc. Once the data is parsed, at 610, it is categorized based on one or more criteria. In one example, the data is categorized based on attribute combinations that are supported and unsupported. Once categorized, the data within the schema can be utilized by a user (e.g., via a software application) to interface with a plurality of devices without causing failure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that facilitates communication between a control component and a plurality of processing components, comprising:

one or more processing components perform one or more tasks, each processing component has at least one attribute associated therewith;

one or more attribute banks that are associated with each of the one or more processing components, wherein each attribute bank stores the at least one attribute;

a control component that initiates the one or more tasks for each processing component;

a universal driver, that facilitates communication between the one or more processing components and the control component including, an interrogation component that queries the one or more processing components to receive the at least one attribute associated with each processing component;

a constraint evaluator that determines combinations of attributes that are supported and unsupported for each of the one or more processing components; and an attribute filter that categorizes each attribute combination based at least in part on whether it is supported or unsupported.

2. The system according to claim 1, further including:
an interface component wherein a user can communicate with the control component.

3. The system according to claim 1, further including:
an unsupported attribute bank that stores one or more attribute combinations that cause device failure for at least one processing component.

4. The system according to claim 3, further including:
a supported attribute bank that stores one or more attribute combinations that do not cause device failure for at least one processing component.

5. The system according to claim 1, wherein the control component is at least one of a computer, a personal digital assistant, a cell phone, and a server.

6. The system according to claim 1, wherein the at least one processing component is one or more of a print engine, a copier, a facsimile machine, a scanner, a server, a document management device and a computer.

7. The system according to claim 1, wherein the attributes associated with each processing component are based at least upon one or more of a make, a model, a manufacturer, and a type of processing component.

8. The system according to claim 1, wherein the control component communicates at least one of a job ticket and a PDL stream to the one or more processing components.

9. The system according to claim 8, wherein the at least one processing components return at least one of a device capability, a device status, and a default job ticket.

10. The system according to claim 1, wherein communication between the control component and the one or more processing components is facilitated via an XML schema.

11. The system according to claim 1, wherein the constraint evaluator determines an attribute combination to be unsupported if the combination causes failure of the processing component.

12. The system according to claim 1, wherein the constraint evaluator is coupled to a memory that stores attribute combinations.

13. The system according to claim 1, wherein the constraint evaluator is coupled to an artificial intelligence component to determine if an attribute combination is one of supported or unsupported.

14. The system according to claim 1, wherein each of the one or more processing components can change its defaults dynamically when a default value is constrained with attributes of a submitted job.

* * * * *